(12) United States Patent
Moroso

(10) Patent No.: US 8,146,250 B2
(45) Date of Patent: Apr. 3, 2012

(54) METHOD OF REPLACING A COMPOSITE AIRFOIL

(75) Inventor: Joseph L. Moroso, Greenville, SC (US)

(73) Assignee: General Electric Company, Schenectady, NY (US)

(*) Notice: Subject to any disclaimer, the term of this patent is extended or adjusted under 35 U.S.C. 154(b) by 978 days.

(21) Appl. No.: 12/129,930

(22) Filed: May 30, 2008

(65) Prior Publication Data

US 2009/0297356 A1 Dec. 3, 2009

(51) Int. Cl.
*B23P 6/00* (2006.01)
*B29C 73/00* (2006.01)
*B29C 45/14* (2006.01)

(52) U.S. Cl. .......... 29/889.1; 29/889.71; 29/402.01; 29/402.18; 264/36.1; 264/139; 264/279

(58) Field of Classification Search ........... 29/889.1, 29/889.7, 889.71, 889.72, 889.722, 402.01, 29/402.03, 402.04, 402.05, 402.07, 402.08, 29/402.09, 402.11, 402.16, 402.18; 264/36.1, 264/139, 279, 279.1; 415/905; 416/229 R, 416/229 A, 241 R, 241 A
See application file for complete search history.

(56) References Cited

U.S. PATENT DOCUMENTS

| | | | | |
|---|---|---|---|---|
| 2,276,262 A | * | 3/1942 | Caldwell et al. | 416/226 |
| 3,883,267 A | * | 5/1975 | Baudier et al. | 416/230 |
| 5,403,161 A | * | 4/1995 | Nealon et al. | 416/230 |
| 5,676,979 A | * | 10/1997 | Folsom et al. | 425/13 |
| 5,691,391 A | * | 11/1997 | Chen et al. | 521/99 |
| 6,233,823 B1 | * | 5/2001 | Schilling | 29/889.71 |
| 8,091,227 B2 | * | 1/2012 | Hong | 29/889.1 |
| 2004/0184921 A1 | * | 9/2004 | Schreiber | 416/229 R |

* cited by examiner

*Primary Examiner* — Sarang Afzali
(74) *Attorney, Agent, or Firm* — Ernest G. Cusick; Frank A. Landgraff

(57) ABSTRACT

A method of replacing a portion of a composite airfoil in a turbine. The method comprises the steps of providing a turbine with a plurality of composite airfoils mounted on a wheel. At least one of the composite airfoils has a core made of a non-plastic material and a plastic airfoil portion to envelope at least a portion of the core. A composite airfoil having an airfoil portion in need of replacement is accessed. The plastic airfoil portion is removed to expose the core while the core is mounted on the wheel. A plastic airfoil portion is molded to envelope the core while the core is mounted on the wheel.

8 Claims, 6 Drawing Sheets

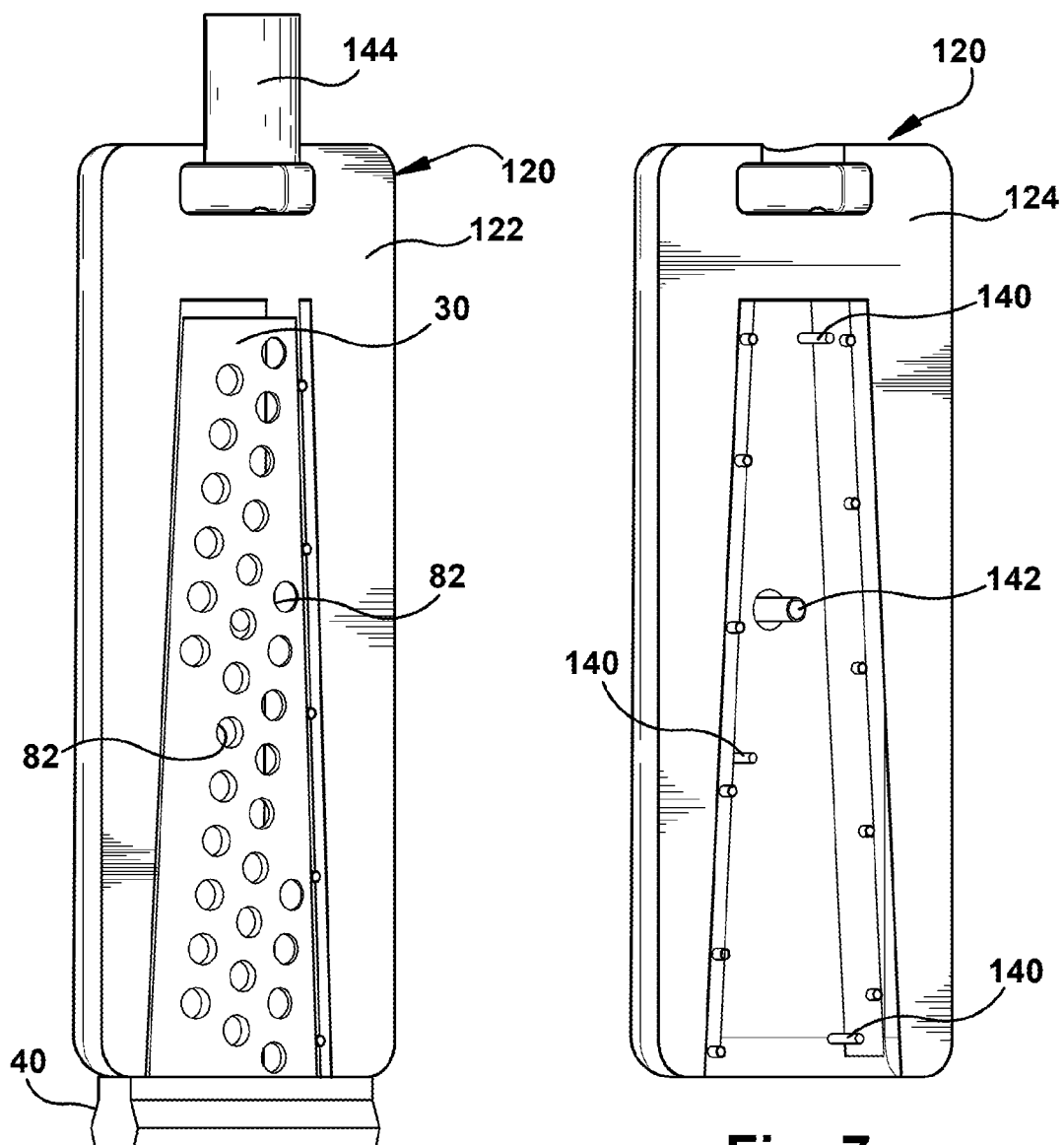

METHOD OF REPLACING A COMPOSITE AIRFOIL

BACKGROUND

The invention relates generally to turbo-machinery. In particular, the invention relates to replacing a composite airfoil used in the turbo-machinery.

Turbo-machinery may take many forms or be applied in various uses. These forms and uses may include steam turbines for power generation, gas turbines for power generation, gas turbines for aircraft propulsion and wind turbines for power generation.

In a gas turbine, typically there are numerous rotating blades and stationary vanes. The blades and vanes are arranged in alternating circumferential arrays that are spaced longitudinally along the turbine. Each of the blades and vanes includes an airfoil portion attached to a mounting portion.

During operation of a gas turbine, dirt, debris and/or moisture may contact the airfoil and result in damage, erosion and/or corrosion to the surface. This usually causes a loss of performance of the gas turbine. Generally, gas turbines for aircraft propulsion permit relatively good access to blades and vanes, so damaged ones can be removed and replaced. However, gas turbines for power generation typically do not offer such access for removing and replacing blades and vanes.

One gas turbine that can be used for power generation as disclosed in U.S. patent application Ser. Nos. 11/858,326 and 11/858,333, has a plurality of compressor and turbine stages. At least one of the compressor stages includes a composite airfoil. The composite airfoil has a mounting structure for attaching to gas turbine structure. A core extends from the mounting structure. The core is made from a material such as metal or ceramic. An airfoil portion envelopes the core and is made from an injection molded plastic material.

Accordingly, there is a need for way to repair or replace a composite airfoil for a gas turbine.

SUMMARY

A method of replacing a portion of a composite airfoil in a turbine according to one aspect of the invention includes the steps of providing a turbine with a plurality of composite airfoils mounted on a wheel. At least one of the composite airfoils has a core made of a non-plastic material and a plastic airfoil portion to envelope at least a portion of the core. A composite airfoil with the plastic airfoil portion in need of replacement is accessed. The plastic airfoil portion is removed to expose the core while the core is mounted on the wheel. A plastic airfoil portion is molded to envelope the core while the core is mounted on the wheel.

A method of replacing a portion of a composite airfoil in a turbine according to another aspect of the invention includes the steps of providing a turbine with a plurality of composite airfoils mounted on a wheel. At least one of the composite airfoils has a core made of a non-plastic material and a plastic airfoil portion to envelope at least a portion of the core. A composite airfoil in need of replacement is accessed. The plastic airfoil portion is removed to expose the core. A plastic airfoil portion is molded to envelope at least the leading edge of the core.

A method of replacing a portion of a composite airfoil according to yet another aspect of the invention includes the steps of providing a composite airfoil in need of replacement. The composite airfoil has a core made of a non-plastic material and a plastic airfoil portion to envelope at least a portion of the core. The plastic airfoil portion is removed to expose the core. A replacement plastic airfoil portion is molded to envelope the core.

DRAWINGS

These and other features, aspects, and advantages of the invention will be better understood when the following description is read with reference to the accompanying drawings, in which:

FIG. 6 is a perspective view of a die part having a core of a composite airfoil mounted therein; and FIG. 7 is a perspective view of another die part.

DETAILED DESCRIPTION

One aspect of the present invention provides a method to repair or replace a composite airfoil used in a gas turbine that has been damaged or needs updating. With this method, composite airfoils used in gas turbines for power generation can be repaired or replaced quickly and on-site.

Figure 1:
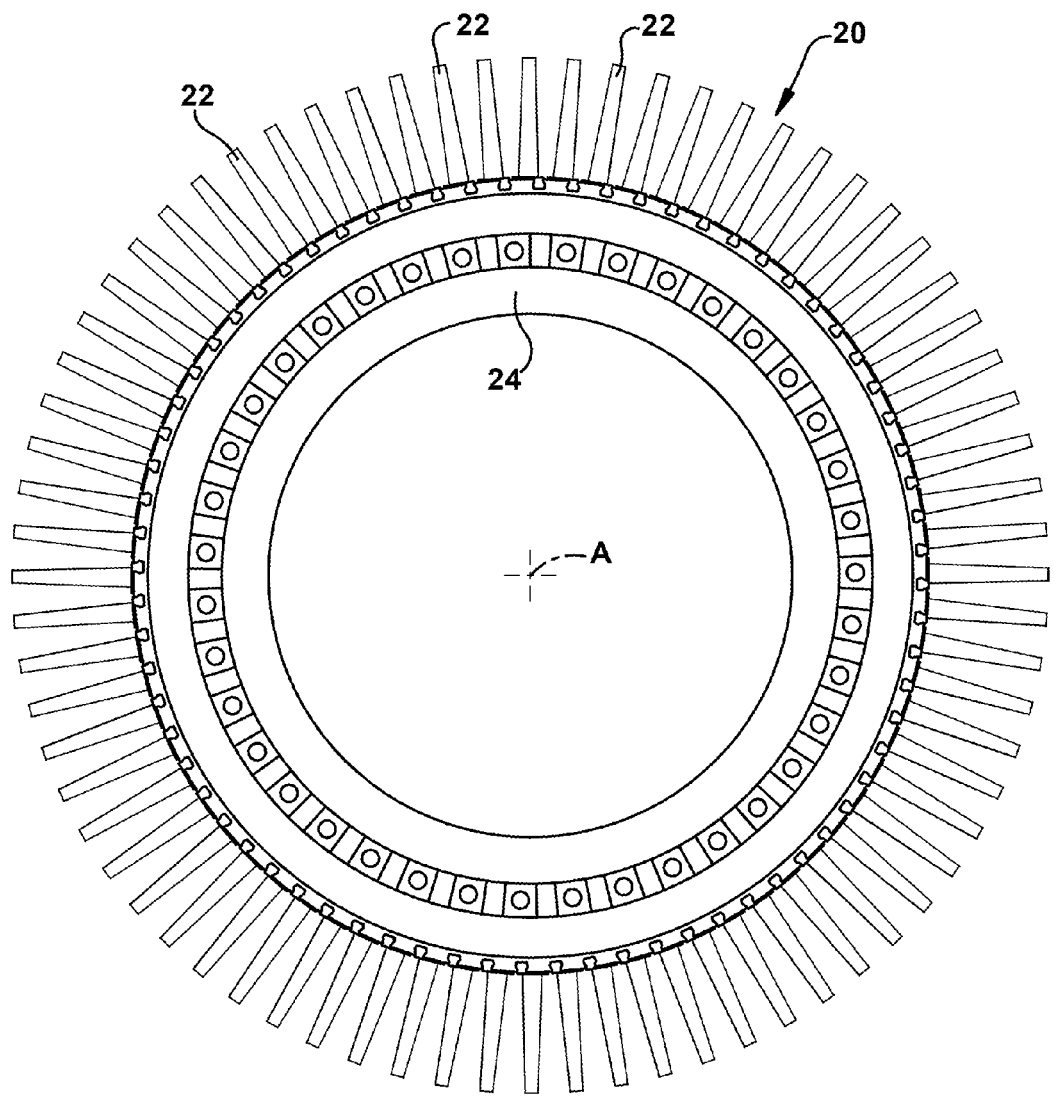
FIG. 1 is an elevational view of a gas turbine stage assembly having composite airfoils mounted on a wheel.

A stage of a rotor assembly 20 is illustrated in FIG. 1. The assembly 20 includes a plurality of composite airfoils 22 in the form of blades mounted to a wheel 24. The assembly 20 is rotatable about an axis A during operation. The assembly 20 is suitable for use in a gas turbine for power generation as, for example, a first stage in a compressor section of the gas turbine. While the assembly 20 is illustrated as being rotatable, it will be apparent that the present invention would be applicable to a non-rotatable vane assembly stage having composite airfoils of a construction similar to that of composite airfoil 22.

Figure 2:
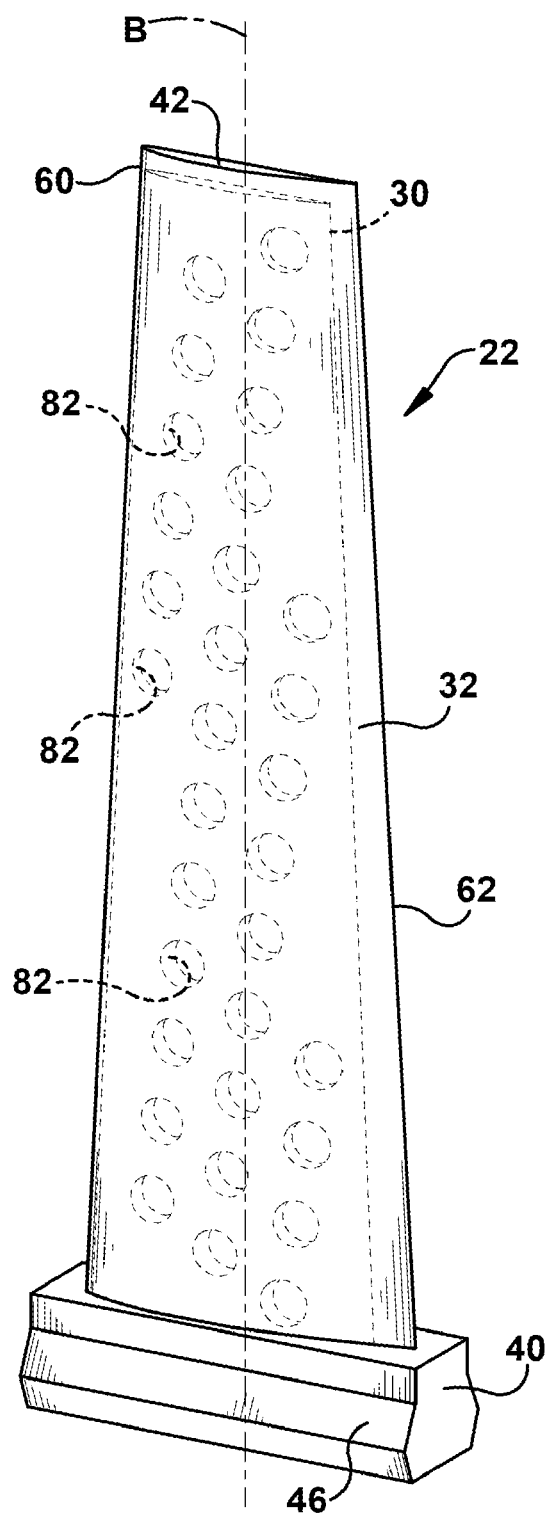
FIG. 2 is a perspective view of one of the composite airfoils illustrated in FIG. 1.

The composite airfoil 22 is illustrated in detail in FIG. 2, according to one aspect of the invention. The composite airfoil 22 includes a core 30. The composite airfoil 22 also includes a plastic airfoil portion 32. The plastic airfoil portion 32 completely envelopes and encapsulates the core 30.

The composite airfoil 22 is made from at least two different materials. As used herein, "composite" is defined as having a plastic material form the finished airfoil portion 32 located over a relatively strong structural material that forms the core 30. The term "plastic" is defined to mean capable of being melted at a temperature relatively lower than the melting point of the material of the core 30 so it can flow and easily be molded to a final desired shape.

A root 40 is attached to the core 30 and is used to mount the composite airfoil 22 to gas turbine structure for operation. The root 40 can be attached to the core 30 by forming the core and root integrally as a one-piece subcomponent, such as by forging or machining from a single piece of raw material. The core 30 may be made from any suitable non-plastic material, such as metal or ceramic. Alternatively the core 30 and root 40 could be made separately and the core could be fastened, welded or otherwise attached to the root. A tip 42 is located at the axially opposite end of the composite airfoil 22 from the root 40. An axis B extends in a direction along the length of the composite airfoil 22 from the root 40 to the tip 42.

The composite airfoil 22 is a designed to operate at the typical temperature that the first few stages of a gas turbine compressor would typically be exposed to. In a gas turbine application for power generation the "design operating temperature" is the maximum temperature the composite airfoil 22 and airfoil portion 32 is expected to experience during normal operation in the first few stages in a compressor. An example of a typical gas turbine design operating temperature in the first few stages is, without limitation, generally in the range of 18° C. to 200° C.

In a compressor blade application of a gas turbine for the composite airfoil 22, the root 40 typically includes a dovetail portion 46, to mount the composite airfoil in a groove of the rotor wheel 24. The airfoil portion 32 has a leading edge 60 and a trailing edge 62.

The airfoil portion 32 is a very complex surface defined by a series of points at sections spaced along the axis B. The leading edge 60 and trailing edge 62 are typically round surfaces defined by relatively small radii. The complex surface, leading edge 60 and trailing edge 62 are relatively difficult to manufacture. For aerodynamic reasons, it is generally desirable to have a leading edge 60 with as small of a radius as possible, for example 0.010 inch which has not been practical previously. It is also desirable to have an extremely smooth and precise final shape for the airfoil portion 32 that does require machinery polishing or coating, which also has not been practical previously. Having an injection molded plastic airfoil portion 32 that is formed to a final or near-final shape provides numerous advantages.

Preferably, the airfoil portion 32 completely envelopes the core 30. In one aspect of the invention, the composite airfoil 22 has the plastic airfoil portion 32 enveloping at least a portion of the metal or ceramic core 30. It will be apparent, however, that the core 30 does not have to be completely enveloped by the airfoil portion 32 and that the core may be partially covered according to another aspect of the invention. The plastic airfoil portion 32 is molded without the need for fiber reinforcement, preferably injection molded, onto the core 30. The injection molding process is capable of forming precise and accurate parts of the airfoil portion 32, leading edge 60, trailing edge 62 and the pressure side surface and suction side surface that extend between the leading and trailing edges.

The internal geometry of the composite airfoil 22 in the form of the core 30 can optimize frequency tuning and structural needs. The external surface can be tailored for aerodynamic performance in the form of the injection molded plastic airfoil portion 32.

In an exemplary aspect, the core 30 has a plurality of openings 82 extending through it. The openings 82 are located in areas of the core 30 that do not need a continuous solid structure for strength or function. The openings 82 lighten the core 30 for lower rotating mass that is generally a desirable feature. The openings 82 receive a portion 84 of the plastic material of the airfoil portion 32 during the injection molding process to retain the airfoil portion in place relative to the core 30. The openings 82 do not have to extend completely through the core 30 but have a depth sufficient to receive portion 84 of the plastic material. The portion 84 of plastic material does not have to completely fill the opening 82 but extend a sufficient distance in to the opening to retain the airfoil portion 32 in place relative to the core 30.

By creating the airfoil portion 32 from injection molded plastic, the desired final airfoil shape for aerodynamic performance can be incorporated and preferably without the need form machinery, polishing or coating. Since the airfoil portion 32 is separated from the internal load carrying structure of the core 30 a design that is more tolerant to damage from ingested debris is also possible. This separation of load carrying structure of the core 30 from the airfoil portion 32 also increases the number of material options available for manufacturing the core to maximize structural features and minimize weight.

The composite airfoil 22, thus, provides an optimal aerodynamic shape with the injection molded plastic airfoil portion 32 and desired structural characteristics with the core 30. The plastic material of the airfoil portion 32 may be any suitable plastic material. The plastic material is selected to be able to survive the design operating temperature of the particular stage of the gas turbine that it is selected to operate in. For example, the first stage of a gas turbine compressor operates at ambient air temperatures and at relatively low pressures compared to other later stages of the compressor.

Figure 3:
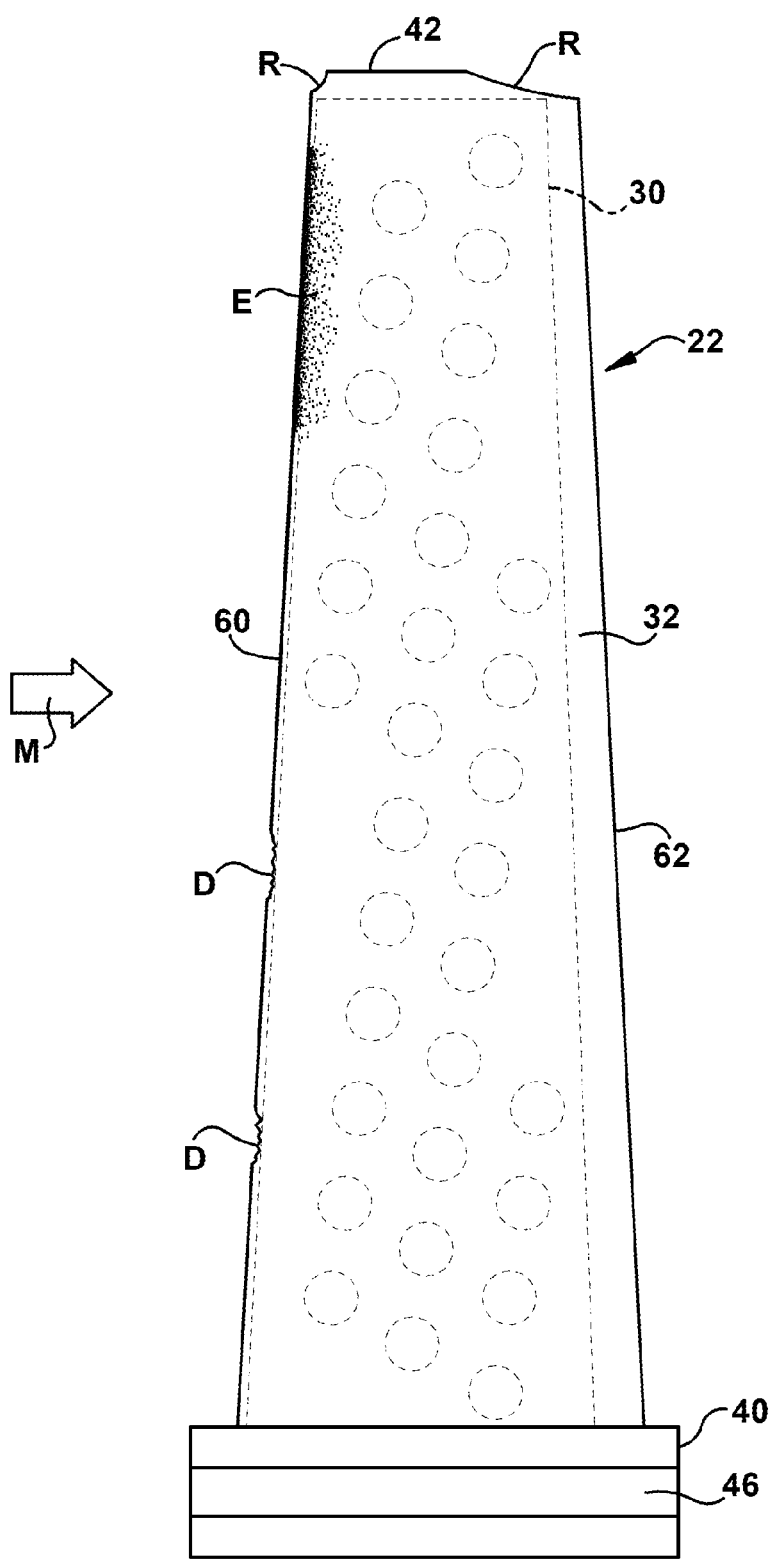
FIG. 3 is a side view of the composite airfoil illustrating representative damage to various portions that may warrant replacement.

Medium M (FIG. 3) flows in the general direction indicated relative to the composite airfoil 22 during operation of the gas turbine. The medium M typically comprises air in the gas turbine application. The direction of medium M flow about the composite airfoil 22 is generally from the leading edge 60 to the trailing edge 62. The plastic material of the airfoil portion 32 is subject to impact damage D to the leading edge 60 from ingested debris, rubbing R of the tip 42 against structure of the gas turbine such as a shroud and erosion E or corrosion from moisture, salt or other fine particulates.

The majority of large frame gas turbines are not designed to have field replaceable airfoils. Disassembly of the rotor assembly 20 is generally required to enable a replacement or repair on most stages of the gas turbine. The injection molded composite airfoil 22 can have the airfoil portion 32 replaced in the field to correct this damage without requiring removal from the rotor wheel 24. The shape and finish of the airfoil portion 32 can be formed to a desired aerodynamic shape to deliver optimum performance of the gas turbine with minimum downtime.

Figure 4:
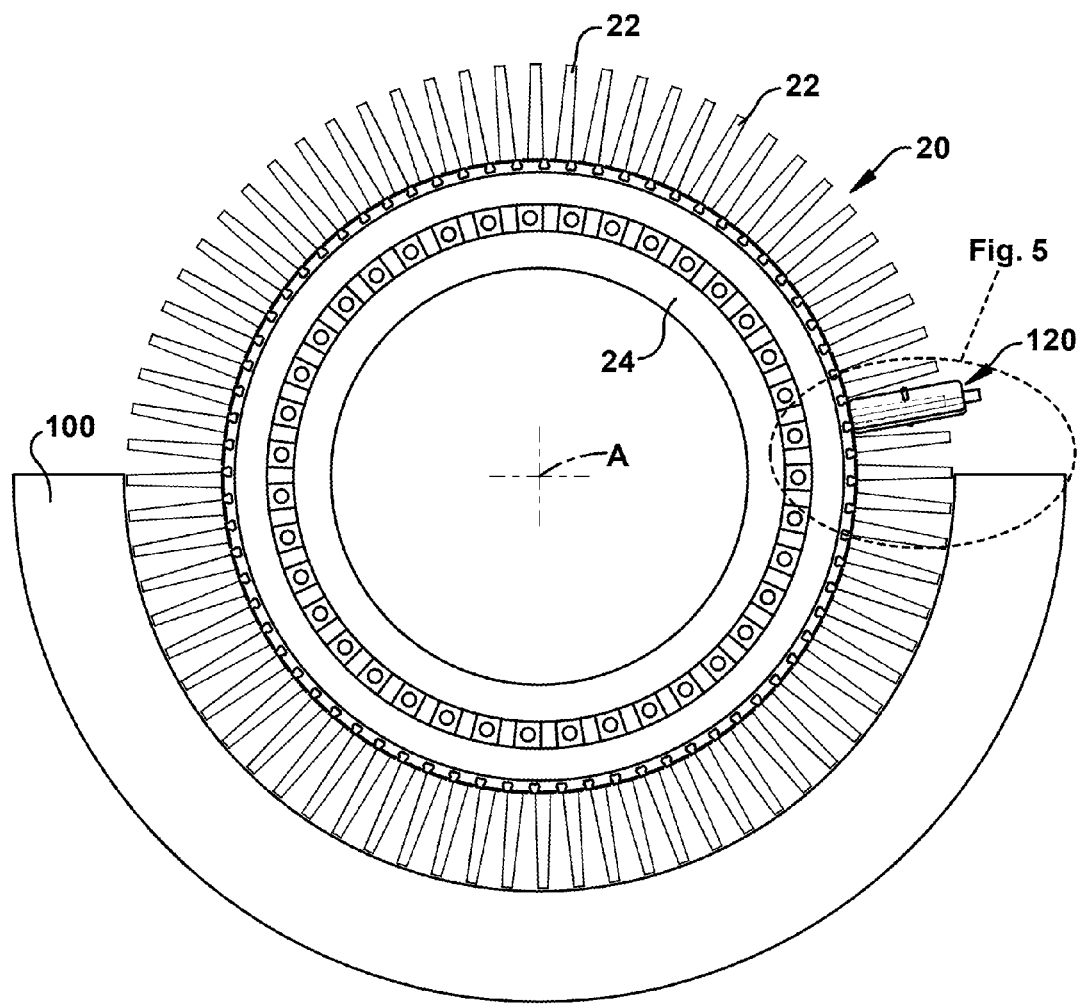
FIG. 4 is an elevational view of the assembly, illustrated in FIG. 1, mounted in a gas turbine housing.
Figure 5:
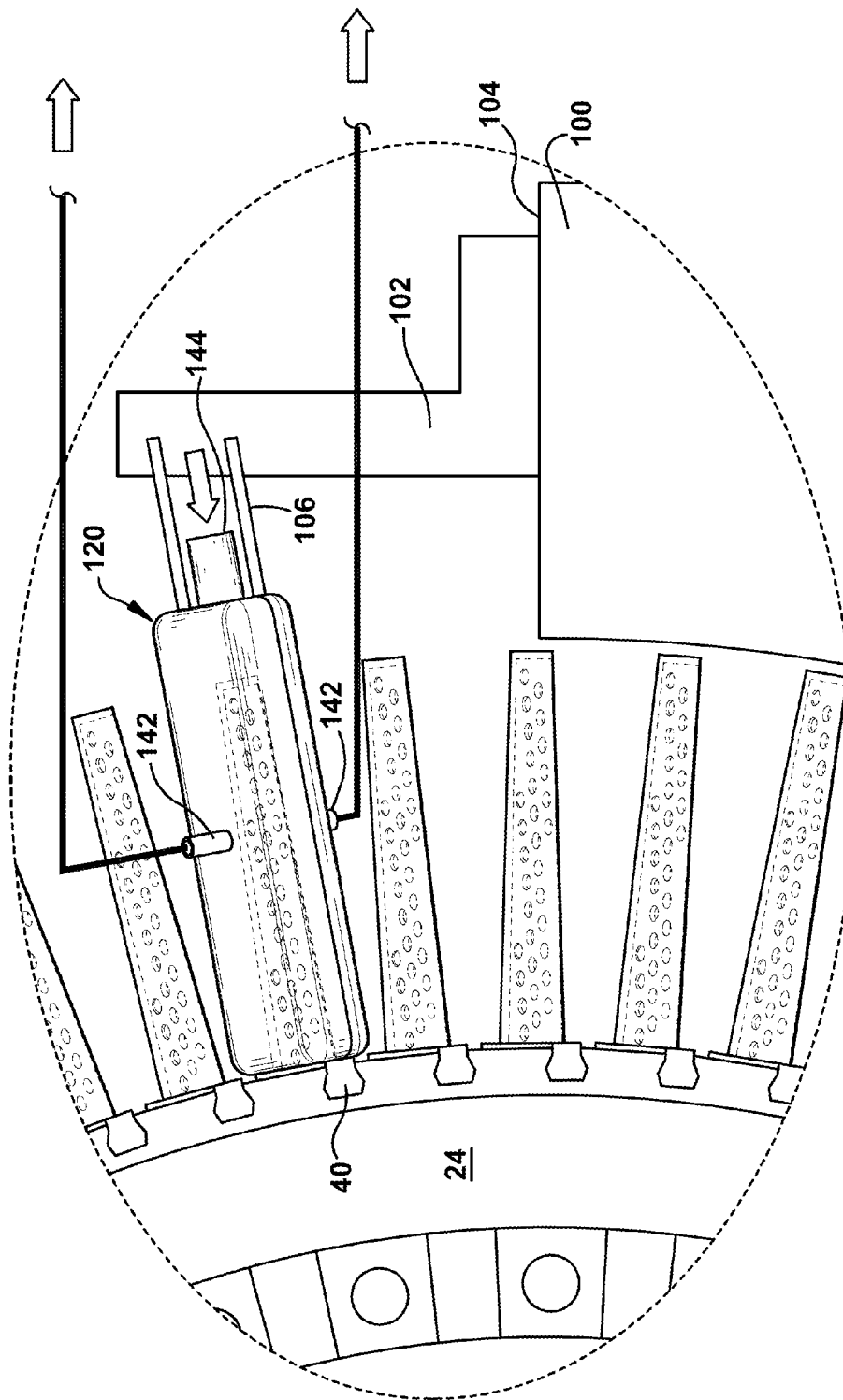
FIG. 5 is an enlarged view of a portion of the assembly and housing illustrated in FIG. 4.

The airfoil portion 32 of the composite airfoil 22 can be replaced according to an aspect of the invention. Replacing the airfoil portion 32 at the location of the gas turbine can be to repair damage or to modify or update the material, shape or finish of the airfoil portion. The replacement process starts by accessing the composite airfoil 22 to be worked on. The casing 100 of the gas turbine is opened, as illustrated in FIGS. 4 and 5. The rotor wheel 24 is rotated to a position in which the composite airfoil 22 to be worked on is accessible.

The existing or current airfoil portion 32 of the composite airfoil 22 is first removed from the core 30. Removal of the existing or current airfoil portion 32 from the core 30 can be accomplished by various processes. Such processes can include, by way of example, mechanical, thermal or chemical removal or any combination of these processes. The actual process used may be dependent on the material used for existing or current airfoil portion 32 of the composite airfoil 22.

An exemplary removal process includes heating the existing or current airfoil portion 32 of the composite airfoil 22. Such heating can be accomplished by using quartz lamps or electric heating elements. The heat is applied until the existing or current airfoil portion 32 reaches a predetermined temperature at which it becomes soft and pliable. Once the predetermined temperature is reached, the existing or current airfoil portion 32 is slit and peeled away from the core 32. The core 30 is then fully exposed while still being mounted to the rotor wheel 24. The core 30 is inspected to determine if it is suitable for further service. If the core 30 is deemed serviceable it is ready for the next step in the process.

A clamshell die assembly 120 (FIGS. 4-5) of an injection molding apparatus is fitted around the core 30 and sealed. The die assembly 120 is held in place relative to the casing 100. A fixture 102 is attached to a joint surface 104 of the casing 100. A holder 106 extends between the die assembly 120 and the fixture 102 to maintain the die assembly in the proper position about the core 30 as the rotor wheel 24 is restrained from rotating.

Each die part 122, 124 of the die assembly 120 (FIGS. 6-7) has a desired finished shape of a portion of the airfoil formed in the die part with allowances for shrinkage and warping. The core 30 is supported in a predetermined position within the die, as illustrated in FIG. 5. Locator pins 140 in the die 120 assist in properly locating the die assembly 120 and the airfoil shape in a predetermined position relative to the core 30. Vents 142 extend from the interior of the die parts 122, 124 to the outside. The root 40 is located outside of the die 120 and has a surface that engages the die assembly 120 to locate the core 30 relative to the die.

The die parts 122, 124 enclose the core 30. The die parts 122, 124 are clamped or fastener together. A conduit 144 is provided to direct melted plastic material into the cavity created by the die assembly 120. The plastic material is melted in the injection molding apparatus. As the melted plastic material flows into the cavity of the die assembly 120 through the conduit 144, air within the cavity can vent or be evacuated through the vents 142 in the die parts 122, 124.

The replacement airfoil portion 32 is injection molded to envelope at least a portion of the core 30 and preferably the entire core. During the injection molding process, the openings 82 in the core 30 are filled with the melted plastic material of the airfoil portion 32. This retains the airfoil portion 32 in a position relative to the core 30. The plastic material then cools and hardens to form the desired shaped formed by the cavity of the die 120 around the core 30. Trimming of flash and final buffing may be required. The replacement airfoil portion 32 is ready for service upon reassembly of the gas turbine.

Specific terms are used throughout the description. The specific terms are intended to be representative and descriptive only and not for purposes of limitation.

The invention has been described in terms of at least one aspect. The invention is not to be limited to the aspect disclosed. Modifications and other aspects are intended to be included within the scope of the appended claims.

Having described at least one aspect of the invention, what is claimed is:

1. A method of replacing a portion of a composite airfoil in a turbine, the method comprising the steps of:
   providing a turbine with a plurality of composite airfoils mounted on a wheel, at least one of the composite airfoils having a core made of a non-plastic material and a plastic airfoil portion to envelope at least a portion of the core;
   accessing a composite airfoil having an airfoil portion in need of replacement;
   removing the plastic airfoil portion to expose the core while the core is mounted on the wheel; and
   molding a plastic airfoil portion to envelope the core while the core is mounted on the wheel, wherein the molding step comprises the steps of: providing a mold; placing and sealing the mold around the core; and directing flowable plastic material into the mold by injection molding to form the plastic airfoil portion enveloping the core.

2. The method of claim 1 wherein injection molding the airfoil portion completely envelopes the core.

3. The method of claim 2 wherein the injection molding includes the step of providing a final shape and finish to the airfoil portion.

4. The method of claim 1 wherein the removing step includes mechanically, thermally or chemically removing the plastic airfoil portion from the core.

5. A method of replacing a portion of a composite airfoil in a turbine, the method comprising the steps of:
   providing a turbine with a plurality of composite airfoils mounted on a wheel, at least one of the composite airfoils having a core made of a non-plastic material and a plastic airfoil portion to envelope at least a portion of the core;
   accessing a composite airfoil having an airfoil portion in need of replacement;
   removing the plastic airfoil portion to expose the core while the core is mounted on the wheel; and
   molding a plastic airfoil portion to envelope at least the a leading edge of the core while the core is mounted on the wheel, wherein the molding step comprises the steps of: providing a mold; placing and sealing the mold around the core; and directing flowable plastic material into the mold by injection molding to form the plastic airfoil portion enveloping the core.

6. The method of claim 5 wherein injection molding the airfoil portion completely envelopes the core.

7. The method of claim 6 wherein the injection molding includes the step of providing a final shape and finish to the airfoil portion.

8. The method of claim 5 wherein the removing step includes mechanically, thermally or chemically removing the plastic airfoil portion.

* * * * *